US007036142B1

(12) United States Patent
Zhang et al.

(10) Patent No.: US 7,036,142 B1
(45) Date of Patent: Apr. 25, 2006

(54) SINGLE STEP NETWORK LOGON BASED ON POINT TO POINT PROTOCOL

(75) Inventors: Shujin Zhang, San Mateo, CA (US); Shuxian Lou, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 836 days.

(21) Appl. No.: 10/074,307

(22) Filed: Feb. 11, 2002

Related U.S. Application Data (63) Continuation of application No. 09/809,764, filed on Mar. 14, 2001, now abandoned, which is a continuation of application No. 09/204,640, filed on Dec. 2, 1998, now Pat. No. 6,253,327.

(51) Int. Cl.
*G06F 13/00* (2006.01)

(52) U.S. Cl. .............................. 726/12; 726/4; 726/12; 726/15; 713/151; 713/153; 713/182; 713/183; 709/230; 709/227; 709/228

(58) Field of Classification Search ................ 713/151, 713/153, 182, 183, 201, 202; 709/230, 227, 709/228; 726/4, 12, 15
See application file for complete search history.

(56) References Cited

U.S. PATENT DOCUMENTS

| 5,003,595 | A |   | 3/1991  | Collins et al. ................. 380/25  |
| 5,241,594 | A | * | 8/1993  | Kung .......................... 713/151  |
| 5,241,599 | A |   | 8/1993  | Bellovin et al. .............. 380/21    |
| 5,351,136 | A |   | 9/1994  | Wu et al. .................... 358/440   |
| 5,416,842 | A |   | 5/1995  | Aziz ........................... 380/30  |
| 5,440,635 | A |   | 8/1995  | Bellovin et al. .............. 380/25    |
| 5,555,244 | A |   | 9/1996  | Gupta et al. ................. 370/60.1  |
| 5,570,361 | A |   | 10/1996 | Norizuki et al. ............. 370/60.1   |
| 5,598,536 | A | * | 1/1997  | Slaughter et al. ........... 709/219     |

(Continued)

FOREIGN PATENT DOCUMENTS

WO         99/53408         10/1999

OTHER PUBLICATIONS

Perkins, "Requirements for an Internet Standard Point-to-Point Protocol", Dec. 1993, Carnegie Mellon University Network Working Group Request for Connects; 1547 Category: International.

(Continued)

*Primary Examiner*—Ayaz Sheikh
*Assistant Examiner*—Taghi T. Arani
(74) *Attorney, Agent, or Firm*—Thelen Reid & Priest LLP; David B. Ritchie (57) ABSTRACT

A method and apparatus for providing single-step logon access for a subscriber to a differentiated computer network having more than one separate access area. In a method for single-step logon a network gateway interface grants a subscriber access to both one or more public network domains, such as the Internet, and one or more private domains, such as community of interest domains or intra-network domains, without requiring the subscriber to launch a separate logon application. Once the subscriber has completed a single step logon to the network interface, the service provider is able to provide the subscriber with simultaneous secure channel access to both public areas and secured private areas. A network gateway interface provides the capability to authenticate the subscriber, provide the subscriber with an IP address and negotiate a point to point protocol session with the subscriber's host, thereby eliminating the need to have the subscriber logon for public area access and then logon for private area access.

55 Claims, 4 Drawing Sheets

U.S. PATENT DOCUMENTS

| | | | | |
|---|---|---|---|---|
| 5,655,077 | A | | 8/1997 | Jones et al. ............. 395/187.01 |
| 5,668,857 | A | | 9/1997 | McHale ................... 379/93.07 |
| 5,671,354 | A | | 9/1997 | Ito et al. ................. 395/187.01 |
| 5,673,265 | A | | 9/1997 | Gupta et al. ................ 370/432 |
| 5,678,006 | A | | 10/1997 | Valizadeh et al. ....... 395/200.2 |
| 5,684,950 | A | * | 11/1997 | Dare et al. ................... 713/201 |
| 5,699,521 | A | | 12/1997 | Iizuka et al. ........... 395/200.15 |
| 5,708,780 | A | | 1/1998 | Levergood et al. .... 395/200.12 |
| 5,715,394 | A | | 2/1998 | Jabs ...................... 395/200.11 |
| 5,740,176 | A | | 4/1998 | Gupta et al. ................ 370/440 |
| 5,764,756 | A | | 6/1998 | Onweller .................... 379/242 |
| 5,835,725 | A | | 11/1998 | Chiang et al. ......... 395/200.58 |
| 5,835,727 | A | | 11/1998 | Wong et al. ........... 395/200.68 |
| 5,845,070 | A | | 12/1998 | Ikudome ................. 395/187.01 |
| 5,857,074 | A | | 1/1999 | Johnson ................. 395/200.47 |
| 5,857,102 | A | | 1/1999 | McChesney et al. ........ 395/653 |
| 5,898,780 | A | | 4/1999 | Liu et al. ...................... 380/25 |
| 5,918,016 | A | | 6/1999 | Brewer et al. ........... 395/200.5 |
| 5,944,824 | A | * | 8/1999 | He .............................. 713/201 |
| 5,958,016 | A | | 9/1999 | Chang et al. ................ 709/229 |
| 5,974,453 | A | | 10/1999 | Andersen et al. ........... 709/220 |
| 5,987,232 | A | | 11/1999 | Tabuki .................. 395/187.01 |
| 5,991,810 | A | | 11/1999 | Shapiro et al. ............. 709/229 |
| 5,991,828 | A | | 11/1999 | Horie et al. .................... 710/8 |
| 6,006,334 | A | | 12/1999 | Nguyen et al. ............. 713/202 |
| 6,009,103 | A | | 12/1999 | Woundy ..................... 370/401 |
| 6,011,910 | A | | 1/2000 | Chau et al. ............ 395/200.59 |
| 6,021,496 | A | | 2/2000 | Dutcher et al. ............. 713/202 |
| 6,026,441 | A | | 2/2000 | Ronen ........................ 709/227 |
| 6,041,054 | A | * | 3/2000 | Westberg .................... 370/389 |
| 6,044,155 | A | | 3/2000 | Thomlinson et al. ....... 713/155 |
| 6,047,376 | A | | 4/2000 | Hosoe ........................ 713/201 |
| 6,091,951 | A | | 7/2000 | Sturniolo et al. ........... 455/432 |
| 6,092,178 | A | | 7/2000 | Jindal et al. .................. 712/27 |
| 6,092,196 | A | | 7/2000 | Reiche ....................... 713/200 |
| 6,119,160 | A | * | 9/2000 | Zhang et al. ............... 709/224 |
| 6,141,687 | A | | 10/2000 | Blair .......................... 709/225 |
| 6,182,142 | B1 | * | 1/2001 | Win et al. ................... 709/229 |
| 6,226,296 | B1 | * | 5/2001 | Lindsey et al. ............. 370/401 |
| 6,253,327 | B1 | * | 6/2001 | Zhang et al. ............... 713/201 |
| 6,317,838 | B1 | * | 11/2001 | Baize ......................... 713/201 |

OTHER PUBLICATIONS

Simpson, "The Point-to-Point Protocol (PPP)", Dec. 1993, Daydreamer Network Working Group, Request for Comments: 1548 obsoletes; RFC 1331; Category; Standards Track.

Bellovin, Steven M., "Problem Areas for the IP Security Protocols", Jul. 22-25, 1996; Proceedings of the Sixth Usenix UNIX Security Sympsioum, San Jose, CA.

Carrel, D. et al., The TACACS+Protocol, Version 1.78, Cisco System, Inc. printed from ftp://ftp-eng.cisco.com/edweber/tac-rfc.1.78.txt on Oct. 23, 2000.

* cited by examiner

SINGLE STEP NETWORK LOGON BASED ON POINT TO POINT PROTOCOL

CROSS REFERENCE TO RELATED APPLICATION

This application is a continuation application based on U.S. patent application Ser. No. 09/809,764, filed on Mar. 14, 2001, now abandoned, which is a continuation based on U.S. patent application Ser. No. 09/204,640, filed on Dec. 2, 1998, now U.S. Pat. No. 6,253,327.

BACKGROUND OF THE INVENTION

1. Field of the Invention

The present invention relates to a method and apparatus for providing simplified access to subscribers of a differentiated computer network. More particularly, the present invention relates to a method and apparatus for single step network logon based on a point to point communication link between the host computer and a server capable of providing both public domain connections and private service domain connections.

2. The Background

In order for a user to access a computer network, such as the Internet or a private Intranet network, the user must generally first dial-in or otherwise connect to a Network Access Server, or NAS. In most instances, the NASs are maintained by Internet Service Providers (ISPs) or Telephone Companies (TelCos) and are located at Network Access Points (NAPs). The NAS serves as the gate between the computer and the user. As a threshold matter, the NAS must authenticate the identity of the user/subscriber in order to ascertain the nature and scope of the services that it will provide to the subscriber. This authentication process is of heightened importance when the network is differentiated into public areas, such as the Internet, that are generally accessible to all subscribers and private areas, such as a business's Intranet, that are accessible only to authorized subscribers.

The authentication procedure generally involves another server, herein referred to as an Authentication, Authorization and Accounting Server, or an AAA Server. The NAS is a client of the AAA Server and, accordingly, the AAA server has the capability to serve numerous client NASs simultaneously. The NAS and AAA server communicate with one another according to a standard Internet protocol, such as the Remote Authentication Dial-In User Service (RADIUS) protocol. The RADIUS Protocol is well known by those of ordinary skill in the art.

Figure 1:
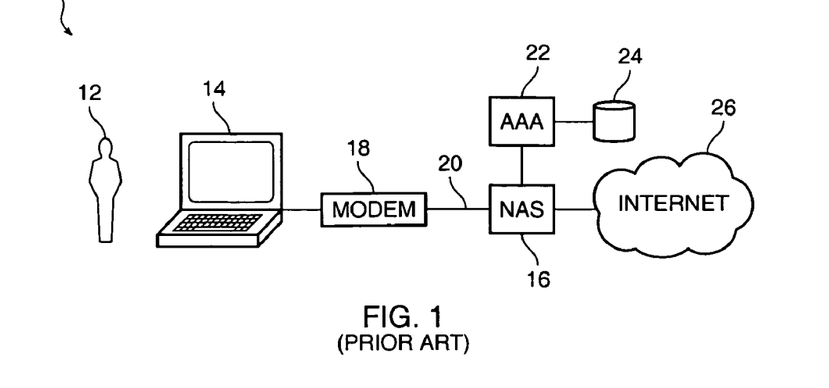
FIG. 1 is a schematic drawing of a computer network having only one access area, such as the Internet, in accordance with the prior art.

FIG. 1. is a schematic diagram of the computer network environment 10 involved in a standard subscriber logon process. In most instances, the subscriber 12 begins a session on the network by first launching a dial-in application on a personal computer or host 14. The dial-in application prompts the subscriber 12 to enter some form of user identification, commonly a user-name and a private password. Such information may also be stored in the host's memory and automatically provided by the host 14. Once the necessary information is provided, the dial-in application contacts a NAS 16, typically, via modem 18 and telephone line 20, and provides NAS 16 with the subscriber 12 or host 14 supplied identification information. The private password data is customarily encrypted using methods well-known by those of ordinary skill in the art. The NAS 16 then prepares and sends an "access request" packet to AAA server 22. The access request packet contains the data supplied by the host 14, as well as additional data identifying the particular NAS 16 client from which the packet was sent.

The AAA server 22 contains a large database 24 of stored information pertaining to the accounts of each subscriber, including user-names, encrypted passwords and configuration information related to the types of services that are authorized to be provided to the subscriber. When AAA server 22 receives an access request packet from an authorized NAS 16 client, it consults the corresponding database 24 of user profiles to locate the account entry for the subscriber 12 identified by the information contained in the access request packet. The account entry will often specify certain requirements that must be met in order for the subscriber 12 to gain access to the network 10, including information on the clients and ports throughout the network that the subscriber 12 is allowed to access. A paramount requirement is that the password entered by the user match the password specified in the account entry on the AAA database 24. If the passwords match, and all other requirements are met, then AAA server 22 sends NAS 16 an "access accept" packet in response. The access accept packet contains configuration data that enables NAS 16 to provide the desired service to the subscriber 12. Once access is granted to the subscriber 12 a connection to the network, in this instance the Internet 26, can be established.

If any requirement is not met, for example, if the passwords do not match, then AAA server 22 responds with an "access-reject" packet indicating that the user request is invalid. The access-reject packet may also contain text messages that may be delivered to the subscriber 12 via NAS 16. As an alternate option, even if all requirements are met, AAA server 22 may still deny immediate access to the user and instead issue an "access-challenge" packet that will effectively prompt the user for new or additional information before access is granted.

Figure 2:
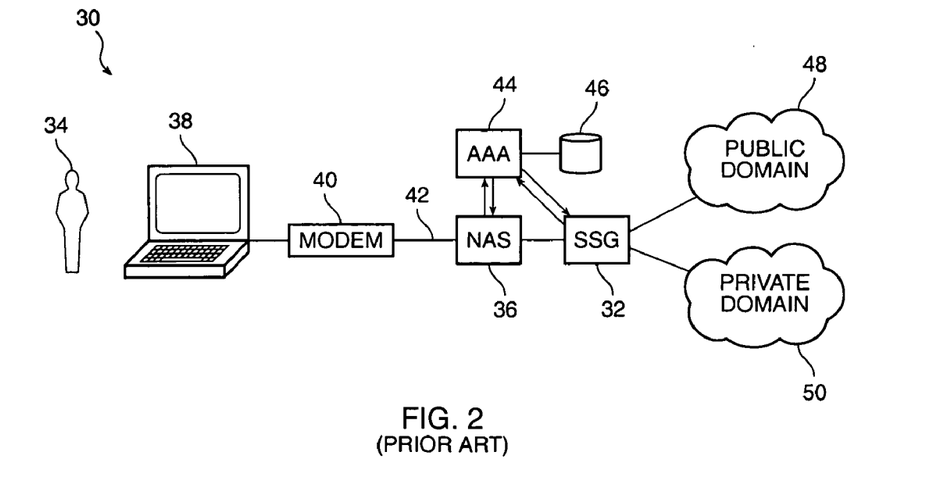
FIG. 2 is a schematic drawing of a differentiated computer network having access to more than one area, such as public domains and private domains in accordance with the prior art.

A complication of the scheme detailed in FIG. 1 arises when the network environment contains private areas whose access is regulated by an additional server or gateway device, herein referred to as a Service Selection Gateway, or SSG server. FIG. 2 is a schematic diagram of the computer network environment 30 that includes a SSG server 32. Among many features of the SSG server 32, it serves to create multiple secure channels to private areas of the network for those subscribers authorized to use such private networks. In order to access the private domains, an authorized subscriber 34 must logon to the SSG server 32, as well as the corresponding NAS 36. The ability to access both the public domains and the private domains currently involves two separate logon procedures.

The dual logon procedure is initiated by the subscriber 34 launching on a host 38 the same dial-in application detailed in the discussion of FIG. 1. The subscriber 34 or host 38 will provide the necessary authorization and identification information. Once this information is provided, the dial-in application will contact NAS 36 and the information will be forwarded from the host 38 to NAS 36. The NAS 36 then communicates with AAA server 44 to authenticate and authorize public access to the subscriber 34. Once this process is completed, then the user must launch a separate and largely redundant "dashboard" application on the host 38 in order to gain access to the private domains gated by the SSG server 32. The subscriber 34 is again prompted by the dashboard application to input identification information. Once the necessary information is provided, the dashboard application contacts the SSG server 32 and provides the SSG server 32 with the subscriber supplied identification information. In much the same fashion as NAS 36 performs, the SSG server 32 prepares and sends an "access request" packet to AAA server 44. In this illustration AAA server 44 and the corresponding database 46 are the same AAA server 44 and database with which NAS 36 communicated. It is also possible to have individual AAA servers and/or databases in communication with NAS 36 and SSG server 32. Once AAA server 44 receives the access request packet from SSG server 32, it consults the corresponding database 46 to locate the service entry for the subscriber 34 identified by the information contained in the access request packet. If the passwords match, and all other requirements are met, then AAA server 44 sends SSG server 32 an "access accept" packet in response. Once access is granted to the subscriber 12 the subscriber is permitted to make connections with both public domains 48 and private domains 50.

The need for this two-step logon process is dictated by how the IP address is assigned. It would not be sufficient to simply pass the identification information from NAS 36 to SSG server 32 because SSG server 32 is incapable of sending information from the private domains without access to the dynamically assigned IP address of the subscriber. From the subscriber's perspective this two-step logon procedure is inefficient. It causes the subscriber time consuming delays in making a connection to a desired service and mandates that the subscriber use storage capacity for a largely redundant software application. The subscriber would benefit from having a one-step logon procedure that provides the necessary authorization and authentication for access to both public domains and private domains.

Figure 3A:
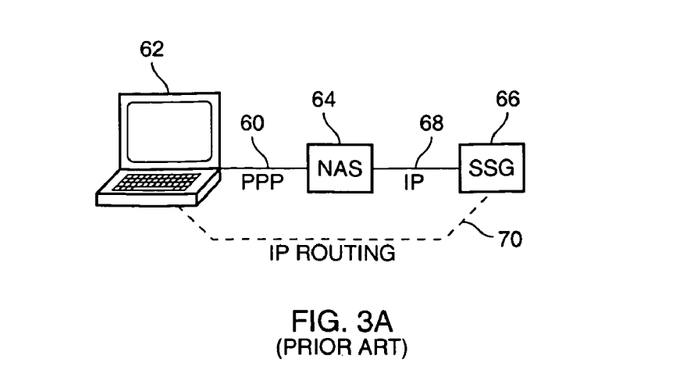
FIG. 3A is a schematic drawing of a simplified computer network highlighting the protocols used as the communication links in a logon procedure in accordance with the prior art.

FIG. 3A illustrates an example of the current communication links, in terms of protocols, between the host 62, NAS 64 and SSG server 66. The initial connection 60 between the host 62 and NAS 64 can be established via Point to Point Protocol (PPP) or another similar protocol.

The Point-to-Point Protocol (PPP) is a data link protocol that provides dial up access over analog or digital transmission lines. PPP provides many advanced features, including error detection, support of multiple protocols, negotiation of IP addresses at connection time, and authentication. There are three main features of PPP. The first is that it provides a framing method to delineate the end of one frame and the beginning of the next one, in order to handle error detection. The second is a Link Control Protocol (LCP) for bringing lines up, testing them, negotiating options, and bringing them down again when they are no longer needed. The third is a manner to negotiate network layer options in a way independent of the network layer protocol to be used. Thus, the method chosen may have a different Network Control Protocol (NCP) for each network layer supported. PPP is characteristically used whenever there are only two endpoints to a link. Since there are only two endpoints in the PPP connection, there is no concept of routing involved. PPP is a standard protocol within the networking field and is well known by those of ordinary skill in the art.

Referring back to FIG. 3A, the second connection 68 between NAS 64 and SSG server 66 is commonly established via Internet Protocol (IP) over a fast ethernet connection. Thus, the overall connection 70 between host 62 and SSG server 66 is ostensibly seen as an IP routing link with no effective PPP session involved.

Figure 3B:
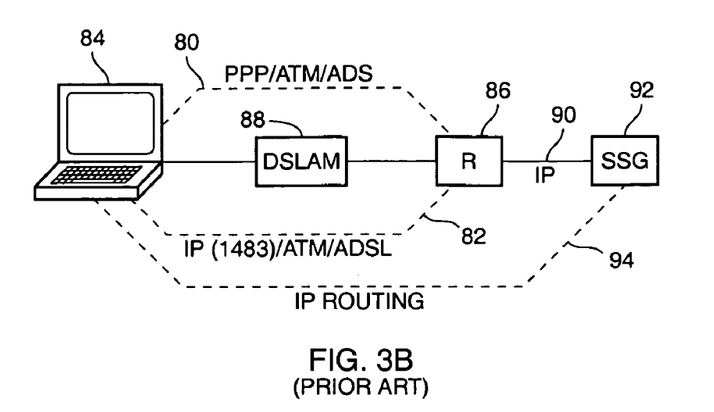
FIG. 3B is a schematic drawing of a bridged computer network highlighting the protocol stacks used as the communication links in a logon procedure in accordance with the prior art.

FIG. 3B illustrates a slightly more complex bridging model of current communication links encompassing IP transport over other media, such as Asymmetric Digital Subscriber Lines (ADSL) and/or Asynchronous Transfer Mode (ATM). The initial connection 80 or 82 between the host 84 and a router 86 which goes through the Digital Subscriber Line Access Multiplexer (DSLAM) 88 can be established by two distinct protocol stacks. A protocol stack is a list of the protocols used by various layers in the network. The first protocol stack 80 is created via a PPP over ATM over ADSL arrangement. PPP is stacked above the ATM, also at layer 2, between the host 84 and the router 86. Additionally, IP or other network layer protocols, commonly referred to as layer 3 protocols, such as IPX, can be transported over the PPP. The second protocol stack 82 is created via an IP (1483 bridging) over ATM over ADSL arrangement. In this instance, ADSL is incorporated at layer 1 between the host 84 and the DSLAM 88. ATM is stacked above ADSL at layer 2, between both the host 84 and the DSLAM 88 and the DSLAM 88 and the router 86. IP (1483 bridging) is stacked above the ATM. An ethernet frame, also at layer 2, is encapsulated within the ATM. A virtual LAN (Large Area Network) is formed between the host 84 and the router 86. Additionally, IP or other network layer protocols, commonly referred to as layer 3 protocols, such as IPX, can be transported over the Ethernet. The second connection 90 between the router 86 and SSG server 92 is commonly established via IP over fast ethernet. Thus, analogous to the simplified network configuration of FIG. 3A, the overall connection between the host 84 and SSG server 92 is ostensibly seen as an IP routing link with no effective PPP session involved.

The one-step logon process that the subscriber desires would benefit from having a new paradigm whereby the host has a direct PPP link to the SSG. Thus, a one-step logon based on PPP creates an efficient method for the subscriber to logon without introducing unnecessary routing and/or bridging. Additionally, all the benefits of having the full PPP link are realized, including: error detection, support of multiple protocols and negotiation of IP addresses at connection time.

BRIEF DESCRIPTION OF THE INVENTION

A method and apparatus for providing single-step logon access for a subscriber to a differentiated computer network having more than one separate access area. In a method for single-step logon a network gateway interface grants a subscriber access to both one or more public network domains, such as the Internet, and one or more private domains, such as community of interest domains or intra-network domains, without requiring the subscriber to launch a separate logon application. Once the subscriber has completed a single step logon to the network interface, the service provider is able to provide the subscriber with simultaneous secure channel access to both public areas and secured private areas. A network gateway interface provides the capability to authenticate the subscriber, provide the subscriber with an IP address and negotiate a point to point protocol session with the subscriber's host, thereby eliminating the need to have the subscriber logon for public area access and then logon for private area access.

DETAILED DESCRIPTION OF THE PRESENT INVENTION

Those of ordinary skill in the art will realize that the following description of the present invention is illustrative only and is not intended to be in any way limiting. Other embodiments of the invention will readily suggest themselves to such skilled persons from an examination of the within disclosure.

In accordance with a presently preferred embodiment of the present invention, the components, process steps and/or data structures are implemented using a gateway device, for example the Cisco model 6510 Service Selection Gateway (SSG), manufactured by Cisco Systems, Inc. of San Jose, Calif. The gateway device allows single subscribers to access multiple domains simultaneously, and allows multiple subscribers at a customer site to access multiple destinations simultaneously. The gateway device also provides the capability to make secured L2F or L2TP tunnel connections between the gateway device and public or private domains. Different implementations may be used and may include other types of operating systems, computing platforms, computer programs, and/or general purpose machines. In addition, those of ordinary skill in the art will readily recognize that devices of a less general purpose nature, such as hardwired devices, devices relying on FPGA (Field Programmable Gate Array) or ASIC (Application Specific Integrated Circuit) technology, or the like, may also be used without departing from the scope and spirit of the inventive concept.

Figure 4:
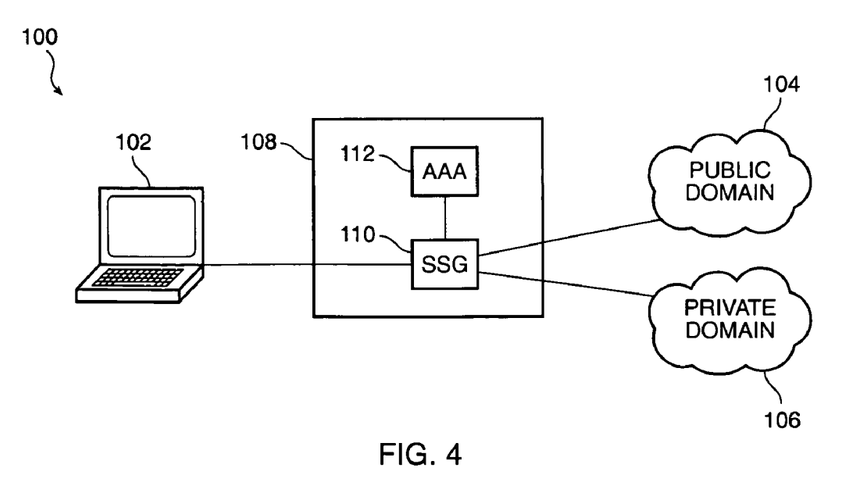
FIG. 4 is a schematic drawing of a differentiated computer network having the capability to provide single-step network logon using Point-to-Point Protocol (PPP) in accordance with a presently preferred embodiment of the present invention.
Figure 5:
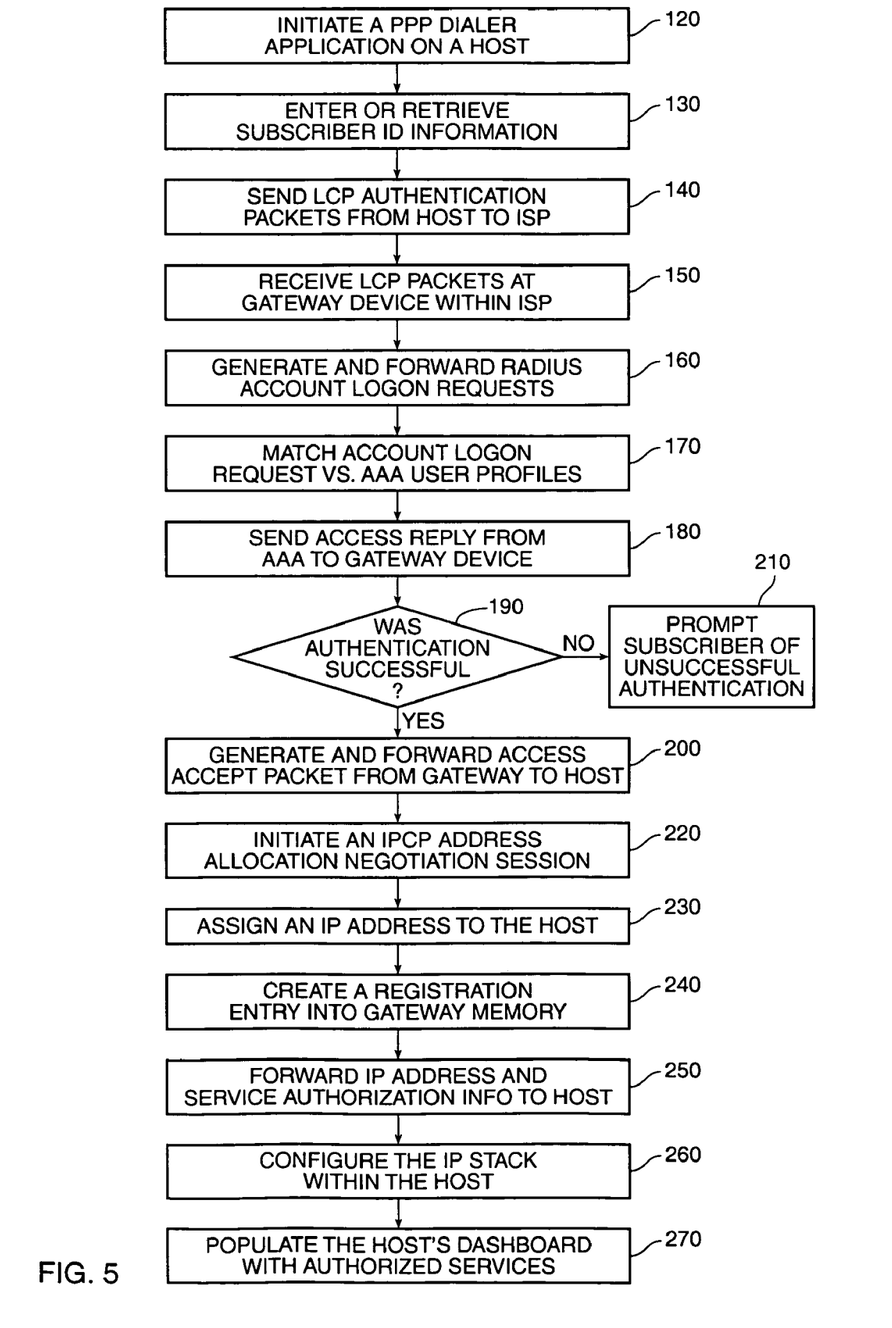
FIG. 5 is a flow diagram of a method for single-step network logon based on PPP in accordance with a presently preferred embodiment of the present invention.

In a presently preferred embodiment of the present invention, a method for single step network logon based on PPP is illustrated by the computer network schematic of FIG. 4 and the flow diagram of FIG. 5. In the simplified schematic of a computer network 100 shown in FIG. 4, the host 102 is able to connect with a public network domain 104, such as the Internet, and a private network domain 106 through an access point 108. The access point 108 is, in most instances, maintained by a computer network service provider, such as a telephone company (Telco) or commercial Internet Service Provider (ISP). The access point 108 serves as a link in the overall network scheme and houses various network interfaces and service components capable of routing and transferring data to and from various points on the network. Shown in FIG. 4 are a gateway device 110, such as the Service Selection Gateway (SSG) Cisco model 6510, manufactured by Cisco Systems, Inc. of San Jose, Calif. and an authentication, authorization and accounting (AAA) server 112, such as Cisco ACS or Cisco Secure, manufactured by Cisco Systems, Inc. of San Jose, Calif. These devices are located within the access point 108 and are used in carrying out the single step network logon method of a presently preferred embodiment of the present invention. The presently preferred embodiment of the present invention uses the PPP protocol as the standard method for transporting multi-protocol data packets over point-to-point links. Other similar protocols capable of transporting multi-protocol data packets over point-to-point links could also be used as would be apparent to those of ordinary skill in the art. The link between the host 102 and the gateway device 110 is a point-to-point link. The AAA server 112 may accommodate several client gateway devices simultaneously and communicate with one another according to a standard Internet protocol. For the presently preferred embodiment of this invention, the Remote Authentication Dial-In User Service (RADIUS) protocol is used as the communication protocol between the gateway device 110 and AAA server 112. RADIUS is standard protocol for communicating authentication, authorization and configuration information between a device that desires to authenticate its links and a shared authentication server. Those of ordinary skill in the art will realize that other protocols can be used as acceptable authentication communication links between the various communication devices that encompass the computer network 100 and still be within the inventive concepts herein disclosed.

FIG. 5 illustrates a flow diagram of a method for single step subscriber logon to a computer network using Point to Point Protocol (PPP) in accordance with a presently preferred embodiment of the present invention. At reference number 120, the subscriber initiates a PPP dialer application on a host computer. An example of a suitable PPP dialer application would be Microsoft Dialup Networking, available from the Microsoft Corporation of Seattle, Wash. In most instances, the subscriber will be prompted by the dialer application to enter appropriate identification and authentication information, usually in the form of a user-name and private password. It is also possible to have this information stored in the host's memory and automatically retrieved by the dialer application upon start-up. The entering or retrieval of authentication and authorization information is reflected at reference number 130. Once the authorization and authentication information is entered the dialer application is instructed to communicate with the ISP or Telco, commonly this is performed by use of a modem.

After the ISP's modem receives the call and establishes a physical connection, at reference number 140, the host computer sends to a gateway device a series of Link Control Protocol (LCP) packets in the payload field of one or more PPP frames. These request packets, and their responses, comprise the negotiation of the authentication session and set the PPP parameters to be used during the logon session. The LCP is used to automatically agree upon the encapsulation format options, handle varying limits on sizes of packets, detect a looped-back link and other common misconfiguration errors, as well as terminate the link. There are currently eleven types of LCP packets. These types are illustrated in Table I below, along with the direction in which they travel (from Initiator (I) to responder (R) or vice-versa) and their description.

TABLE 1

| Name | Direction | Description |
| --- | --- | --- |
| Configure-request | I → R | List of proposed options and values |
| Configure-ack | I ← R | All options are accepted |
| Configure-nak | I ← R | Some options are not accepted |
| Configure-reject | I ← R | Some options are not negotiable |
| Terminate-request | I → R | Request to shut down the line |
| Terminate-ack | I ← R | OK to shut down the line |
| Code-reject | I ← R | Unknown request received |
| Protocol-reject | I ← R | Unknown protocol received |
| Echo-request | I → R | Please send this frame back |
| Echo-reply | I ← R | Here is the frame back |
| Discard-request | I → R | Discard this frame (for testing) |

At reference number 150, the gateway device receives the LCP packets containing the authorization and authentication information from the host computer. The gateway device, at reference number 160, generates and forwards to an authentication server a RADIUS account logon request packet. At reference number 170, the authentication server matches the access request packet against unique user profiles to verify the authenticity of the subscriber. The user profiles are stored within the memory of the authentication server or a local cache in communication with the authentication server. Next, at reference number 180, the authentication server sends an authentication reply back to the gateway device that confirms the status of the authentication. If, at reference number 190, the authentication reply indicates that the authentication process was successful then, at reference number 200, the gateway device notifies the host by generating and sending an LCP access-accept packet from the gateway device to the host. If the authentication reply indicates that the authentication process was unsuccessful then, at reference number 210, the gateway device sends a prompt back to the host notifying the subscriber that the authentication process was unsuccessful.

Once the host has been notified of a successful authentication, the host, at reference number 220, initiates an Internet Protocol Control Protocol (IPCP) negotiation session with the gateway device. The IPCP is one of many protocols within the Network Control Protocol family and it serves to provide the ability to dynamically configure IP addresses over PPP. The IPCP negotiation session results in the gateway device, at reference number 230, assigning an IP address to the host from either; (a) an IP address found in the RADIUS access-accept packet previously sent from the authentication server, or; (b) the IP address is assigned from a local pool of addresses found within the memory of the gateway device. Once the IP address is assigned the gateway device at reference number 240, creates an entry into a gateway device memory table that registers the subscriber (i.e. writing into the gateway device's memory) according to the IP address assigned, the identification information previously supplied by the subscriber and the configuration data found in the authentication reply packet. By registering the subscriber within the gateway device it allows for the subscriber to perform a single logon procedure to access both public domains and private domains. When the subscriber desires access to an authorized private domain the registration within the gateway device memory provides the manner by which authorization is granted. The subscriber remains registered within the gateway device memory for the duration of the logon session. At step 250, the assigned IP address and service authorizations are returned via IPCP to the host. Once the IP address is received by the host, at reference number 260, the host configures the IP stack and the PPP session between the host and the gateway device is functional. As an indicator that the logon has been successfully completed and the subscriber has been authorized and authenticated, at reference number 270, the dashboard application on the host computer is populated with the services authorized for that particular subscriber.

Figure 6:
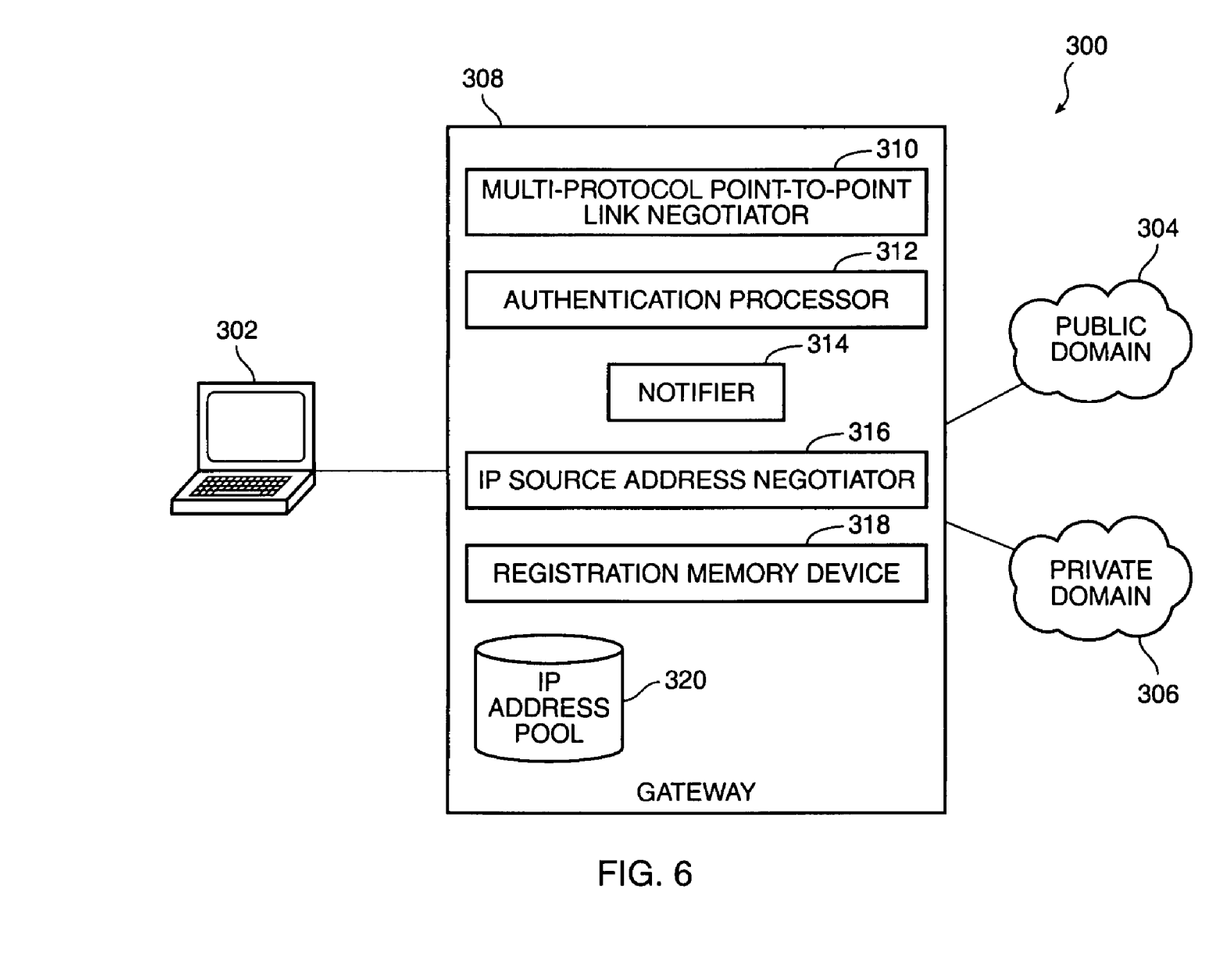
FIG. 6 is a schematic drawing of an apparatus for implementing single-step network logon based on PPP in accordance with a presently preferred embodiment of the present invention.

FIG. 6 is a schematic drawing of a computer network 300 embodying an apparatus for implementing single-step network logon based on PPP in accordance with a presently preferred embodiment of the present invention. The host 302 logs on to both a public domain 304 and a private domain 306 through a gateway device 308. The gateway device 308 is capable of providing secure, simultaneous, L2F or L2TP tunnel-type connections to both the public domain 304 and the private domain 308.

The gateway device 308 encompasses a multi-protocol point-to-point link negotiator 310 that is in communication with the host 302 and serves to set-up and maintain the PPP communication link between the host 302 and the gateway device 308. An authentication processor 312 within the gateway device 308 receives identification information from the host 302 and then processes the identification information to assess the authenticity of the subscriber. Once authentication of the subscriber has been verified a notifier 314 that is in communication with the host 302 sends notification of successful authentication to the host 302. Once the host 302 has notification of successful authentication, the source address negotiator 316 is engaged for negotiating a dynamically assigned IP address for the host 302. The source address negotiator can obtain an IP address from either an IP address data pool 320 within the gateway device 308 or an IP address may pre-exist in the access reply request handed down by the authentication processor 312. Once the IP address has been assigned to the host 302, a registration memory device 318 makes a table entry for the subscriber based on the IP address assigned, the subscriber supplied identification information and the configuration and service authorization information. This subscriber specific table entry allows for the subscriber to perform only one logon procedure. The need for subsequent logons to other services or domains is obviated by the gateway device storing in memory the subscriber's authentication and authorization information for the duration of the subscriber's logon session.

ALTERNATIVE EMBODIMENTS

Although illustrative presently preferred embodiments and applications of this invention are shown and described herein, many variations and modifications are possible which remain within the concept, scope and spirit of the invention, and these variations would become clear to those skilled in the art after perusal of this application. The invention, therefore, is not limited except in spirit of the appended claims.

What is claimed is:

1. A method for single-step subscriber logon to a differentiated data communications network including a first domain and a second domain, said method comprising:

communicating, by a network interface, between the network interface and a host, wherein said communicating comprises a transport of multi-protocol data packets over a point-to-point communication link between the host and the network interface;

identifying a source address for the host; and authorizing the host to access said first domain and said second domain based upon login information obtained from the host.

2. The method of claim 1 further comprising:
authenticating said subscriber based upon login information obtained from the host.

3. The method of claim 2 wherein said authenticating is accomplished using Link Control Protocol (LCP).

4. The method of claim 1 wherein said identifying is accomplished using Internet Protocol Control Protocol (IPCP).

5. The method of claim 1 wherein said identifying further comprises:
assigning an Internet Protocol address to the host from a pool of addresses located in a memory.

6. The method of claim 1 wherein said identifying further comprises:
assigning an Internet Protocol address to the host from an authentication reply packet received from an authentication server.

7. The method of claim 1 wherein said communicating is accomplished using Point-to-Point Protocol (PPP).

8. The method of claim 1 wherein said authorizing further comprises:
writing said login information into a memory.

9. A method for single-step subscriber logon to a differentiated data communications network including a first domain and a second domain, said method comprising:
authenticating in a network interface a host based upon login information obtained from the host;
communicating, by the network interface, between the network interface and the host, wherein said communicating comprises a transport of multi-protocol data packets over a point-to-point link existing between the host and the network interface;
identifying a source address for the host;
writing said login information into a memory; and
authorizing the host to access said first domain and said second domain based upon said login information.

10. A method for single-step subscriber logon to a differentiated data communication network including same-session access capabilities to a first domain and a second domain, said method comprising:
communicating between a network interface and a host, wherein said communicating comprises a transport of multi-protocol data packets over a point-to-point communication link between the host and the network interface;
identifying a source address for the host; and
authorizing the host to access said first domain and said second domain based upon login information obtained from the host.

11. The method of claim 10 further comprising:
authenticating the host based upon login information obtained from the host.

12. The method of claim 11 wherein said authenticating is accomplished using Link Control Protocol (LCP).

13. The method of claim 10 wherein said identifying is accomplished using Internet Protocol Control Protocol (IPCP).

14. The method of claim 10 wherein said identifying further comprises: assigning an Internet Protocol address to the host from a pool of addresses located in a memory.

15. The method of claim 10 wherein said identifying further comprises:
assigning an Internet Protocol address to the host from an authentication reply packet received from an authentication server.

16. The method of claim 10 wherein said communicating is accomplished using Point-to-Point Protocol (PPP).

17. The method of claim 10 wherein said authorizing further comprises:
writing said login information into a memory.

18. A method for single-step subscriber logon to a differentiated data communication network including same-session access capabilities to a first domain and a second domain, said method comprising:
authenticating a host based upon login information obtained from the host;
communicating, by the network interface, between the network interface and the host, wherein said communicating comprises a transport of multi-protocol data packets over a point-to-point link existing between the host and the network interface;
identifying a source address for the host;
writing said login information into a memory; and
authorizing the host to access said first domain and said second domain based upon said login information.

19. A method for single-step subscriber logon of a host to a differentiated data communication network having access to a first domain and a second domain comprising:
receiving login information from said host;
authenticating said host based upon said login information;
storing said login information in a memory;
notifying said host once a successful authentication process has been completed;
initiating an address allocation negotiation session;
assigning a source address to said host;
communicating, by a network interface, between the network interface and said host, wherein said communicating comprises a transport of multi-protocol data packets over a point-to-point link existing between said host and said network interface; and
writing a subscriber-related entry into the memory based upon said source address and said login information.

20. The method of claim 19 wherein said authenticating further comprises:
processing an authentication request packet based upon said login information;
sending said authentication request packet to an authentication memory bank; and
receiving a reply packet from said authentication memory bank.

21. The method of claim 20 wherein said sending further comprises:
sending said authentication request packet via a Remote Access Dial-In User Service (RADIUS) protocol communication link.

22. The method of claim 20 wherein said writing further comprises:
writing said subscriber-related entry into the memory based upon configuration information in said reply packet from said authentication memory bank.

23. The method of claim 19 wherein said login information comprises a user name and a user authenticator.

24. The method of claim 19 wherein said receiving further comprises:
receiving login information using a Link Central Protocol (LCP) communication link.

25. The method of claim 19 wherein said initiating further comprises:

utilizing an Internet Protocol Control Protocol (IPCP) communication link.

26. The method of claim 19 wherein said assigning further comprises:
retrieving a subscriber Internet Protocol address from a pool of addresses located in the memory.

27. The method of claim 19 wherein said assigning further comprises:
retrieving a subscriber Internet Protocol address from an access accept reply packet received from an authentication server.

28. The method of claim 19 wherein said communicating further comprises:
utilizing a Point-to-Point Protocol session between said host and said network interface.

29. An apparatus for single step logon of a host to a differentiated data communication network having the capacity to create same-session open channels to a first domain and a second domain, the apparatus comprising:
means for communicating via a network interface with a host, wherein said communicating comprises a transport of multi-protocol data packets over a point-to-point communication link existing between the host and the network interface;
means for identifying a source address for the host; and
means for authorizing the host to access said first domain and said second domain based upon login information obtained from the host.

30. The apparatus of claim 29 further comprising:
means for authenticating the host based upon login information obtained from the host.

31. The apparatus of claim 29 wherein said means for communicating further comprises:
means for communicating between the host and the network interface using a Point-to-Point Protocol session.

32. The apparatus of claim 29 wherein said means for authorizing further comprises:
means for writing said login information into a memory.

33. An apparatus for single-step subscriber logon of a host to a differentiated data communication network having access to a first domain and a second domain comprising:
means for receiving login information from said host;
means for authenticating said host based upon said login information;
means for storing said login information in a memory;
means for notifying said host once a successful authentication process has been completed;
means for initiating an address allocation negotiation session;
means for assigning a source address to said host;
means for communicating, by a network interface, between the network interface and said host, wherein said communicating comprises a transport of multi-protocol data packets over a point-to-point link existing between said host and said network interface; and
means for writing a subscriber-related entry into the memory based upon said source address and said login information.

34. A program storage device readable by a machine, tangibly embodying a program of instructions executable by the machine to perform a method for single-step subscriber logon to a differentiated data communications network including a first domain and a second domain, said method comprising:
communicating, by a network interface, between the network interface and a host, wherein said communicating comprises a transport of multi-protocol data packets over a point-to-point communication link between the host and the network interface;
identifying a source address for the host; and
authorizing the host to access said first domain and said second domain based upon login information obtained from the host.

35. The program storage device of claim 34 wherein said method further comprises:
authenticating the host based upon login information obtained from the host.

36. The program storage device of claim 34 wherein said authorizing further comprises:
writing said login information into a memory.

37. A program storage device readable by a machine, tangibly embodying a program of instructions executable by the machine to perform a method for single-step subscriber logon to a differentiated data communication network including secure simultaneous access capabilities to a first domain and a second domain, said method comprising:
communicating, by a network interface, between the network interface and a host, wherein said communicating comprises a transport of multi-protocol data packets over a point-to-point communication link between the host and the network interface;
identifying a source address for the host; and
authorizing the host to access said first domain and said second domain based upon login information obtained from the host.

38. The program storage device of claim 37 wherein said method further comprises:
authenticating the host based upon login information obtained from the host.

39. The program storage device of claim 37 wherein said method further comprises:
writing said login information into a memory.

40. A gateway for single-step subscriber logon of a host to a differentiated data communication network having access to a first domain and a second domain, the gateway comprising:
a multi-protocol point-to-point link device for establishing a communication link for the transport of multi-protocol data packets between the host and the gateway;
a source address device for obtaining a source address for the host; and
an authentication processor for authorizing the host to access the first domain and the second domain based upon login information obtained from the host.

41. The gateway as defined in claim 40, wherein the authentication processor authenticates the host based upon the login information.

42. An apparatus for single-step subscriber logon of a host to a differentiated data communication network having access to a first domain and a second domain, the apparatus comprising:
a multi-protocol point-to-point link device in communication with the host for establishing a communication link;
a source address device in communication with the host for negotiating a dynamic Internet Protocol (IP) address; and
an authentication processor for authorizing the host to access the first domain and the second domain based upon login information obtained from the host.

43. The apparatus as defined in claim 42, wherein the authentication processor receives the login information from the host and authenticates the host.

44. The apparatus as defined in claim 42, further comprising a notifier in communication with the authentication processor and the host for notifying the host of an authentication status.

45. The apparatus as defined in claim 42, further comprising a registration memory in communication with the authentication processor and the source address device for tabulating the login information and the dynamic IP address.

46. The gateway as defined in claim 40, further comprising a notification device in communication with the authentication processor and the host for sending the host an authentication status.

47. The gateway as defined in claim 40, further comprising a registration memory in communication with the authentication processor and the source address device for tabulating the login information and the source address.

48. An apparatus for single-step subscriber logon to a differentiated data communications network including a first domain and a second domain, the apparatus comprising:
 means for communicating, by a network interface, between the network interface and a host, wherein the communicating comprises a transport of multi-protocol data packets over a point-to-point communication link between the host and the network interface;
 means for identifying a source address for the host; and
 means for authorizing the host to access the first domain and the second domain based upon login information obtained from the host.

49. The apparatus as defined in claim 48, further comprising means for authenticating the host based upon login information obtained from the host.

50. The apparatus as defined in claim 48, wherein the means for identifying further comprises means for assigning an Internet Protocol address to the host from a pool of addresses located in a memory.

51. The apparatus as defined in claim 48, wherein the means for identifying further comprises means for assigning an Internet Protocol address to the host from an authentication reply packet received from an authentication server.

52. A program storage device readable by a machine, tangibly embodying a program of instructions executable by the machine to perform a method for single-step subscriber logon of a host to a differentiated data communication network having access to a first domain and a second domain, the method comprising:
 receiving login information from the host;
 authenticating the host based upon the login information;
 storing the login information in a memory;
 notifying the host once a successful authentication process has been completed;
 initiating an address allocation negotiation session;
 assigning a source address to the host;
 communicating, by a network interface, with between the network interface and the host, wherein the communicating comprises a transport of multi-protocol data packets over a point-to-point link existing between the host and the network interface; and
 writing a subscriber-related entry into the memory based upon the source address and the login information.

53. The program storage device as defined in claim 52, wherein the authenticating further comprises:
 processing an authentication request packet based upon the login information;
 sending the authentication request packet to an authentication memory bank; and
 receiving a reply packet from the authentication memory bank.

54. The program storage device as defined in claim 52, wherein the assigning further comprises:
 retrieving a subscriber Internet Protocol address from a pool of addresses located in the memory.

55. The program storage device as defined in claim 52, wherein the assigning further comprises:
 retrieving a subscriber Internet Protocol address from an access accept reply packet received from an authentication server.

* * * * *